Patented July 17, 1951

2,561,208

UNITED STATES PATENT OFFICE 2,561,208

THIOCARBAMIC ACID DERIVATIVES OF ALKYLENEBIS (CYCLOHEXYL AMINE)

William Kirk, Jr., New Castle, Del., assignor to E. I. du Pont de Nemours & Company, Wilmington, Del., a corporation of Delaware No Drawing. Application March 30, 1948, Serial No. 18,070

7 Claims. (Cl. 260—429)

This invention relates to organic compounds and, more particularly, to new dithiocarbamic acids and derivatives thereof.

Many dithiocarbamic acids are known. In general, however, they have poor storage stability, a defect which detracts greatly from their usefulness.

This invention has as an object the preparation of new dithiocarbamic acids. A further object is the preparation of new derivatives thereof. Another object is the provision of new dithiocarbamyl compounds of storage stability greater than that of prior art dithiocarbamyl derivatives. Other objects will appear hereinafter.

These objects are accomplished by the invention of dithiocarbamic acids of the formula

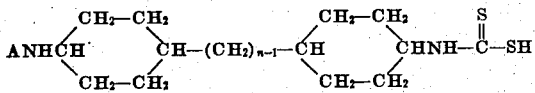

wherein A is —H or

and $n$ is an integer from 1 to 5, and the salts, esters, and sulfides of said acids. The salts include compounds wherein the H in the —CSSH group or groups is replaced by metals or salt-forming elements or radicals such as, for example, ammonium or alkyl- or aryl-substituted ammonium; the esters include compounds wherein the H in the —CSSH group or groups is replaced by alkyl or aryl radicals; and the sulfides include compounds wherein the H in the —CSSH group or groups is replaced by

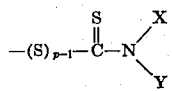

wherein $p$ is an integer from 1 to 2 and X and Y are alkyl radicals or may be joined in an alicyclic ring.

These new dithiocarbamic acids and their salts are readily prepared by reacting carbon disulfide with dialicyclic diamines having two aminocyclohexyl radicals joined, at the 4 positions of each, through not more than four methylene groups, i. e., dialicyclic diamines of the formula

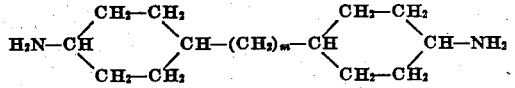

where $m$ is a cardinal number not greater than 4, i. e., dialicyclic diamines of the following formula:

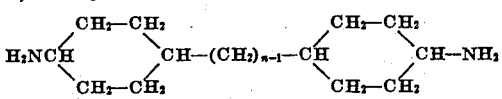

wherein $n$ is an integer from 1 to 5, such as, for example, bis(4-aminocyclohexyl), 1,2-bis(4-aminocyclohexyl)ethane, and 1,4-bis(4-aminocyclohexyl)butane. When carbon disulfide is reacted alone with the dialicyclic diamine, the reaction is described by the following equation, regardless of whether an excess of carbon disulfide is present or not:

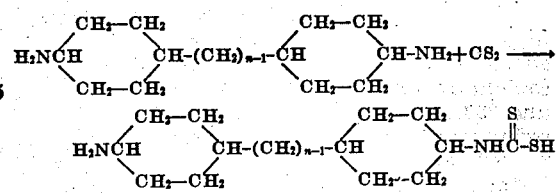

wherein $n$ is an integer from 1 to 5. Although the structure of the product of this reaction has been written as a monodithiocarbamic acid of a dialicyclic diamine, it may exist as the salt of the acid with the unreacted amino group of the dialicyclic diamine. Further, this salt may be polymeric.

However, when carbon disulfide in amount sufficient to combine with both of the amino groups of the dialicyclic diamine is reacted with the dialicyclic diamine in the presence of an equivalent amount of a base stronger than the dialicyclic diamine, such as sodium hydroxide, the reaction is described by the following equation:

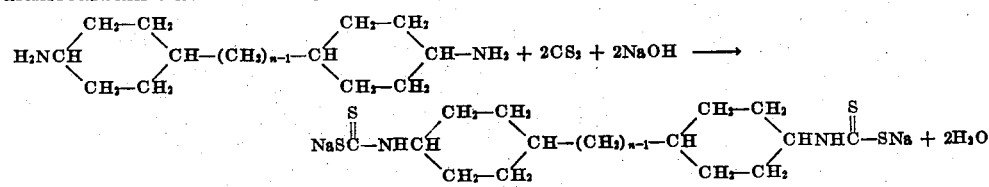

are readily prepared by reacting carbon disulfide with dialicyclic diamines having two aminocyclohexyl radicals joined, at the 4 positions of Other derivatives of the dithiocarbamic acids of this invention can be prepared by the methods, as described later, which methods result in the replacement of the acid hydrogen of the dithiocarbamic acid group or groups by salt-forming groups or elements or by monovalent organic radicals. Such derivatives of the dithiocarbamic acids of this invention from dialicyclic diamines are, in general, more stable than the corresponding derivatives of other dithiocarbamic acids.

The following examples, in which the parts given are by weight, further illustrate the products of this invention.

EXAMPLE I

*Preparation of 4-(4-aminocyclohexylmethyl) cyclohexanedithiocarbamic acid*

A solution of 10.5 parts of bis(4-aminocyclohexyl)methane (B. P. 112° C./0.5 mm., 132.5° C./1.1 mm., whose preparation is described in copending application Serial No. 615,912, filed September 12, 1945, by Kirk, Schreiber, and Whitman, now abandoned, and application Serial No. 704,796, filed October 21, 1946, by Barkdoll and Whitman) in 35 parts of dry ether was gradually added with stirring to a solution of 12.5 parts of carbon disulfide and 35 parts of dry ether in a glass reactor fitted with a reflux water condenser. A white, crystalline salt separated immediately which was filtered from the reaction mixture and subsequently air-dried. There was obtained 14 parts (98% of theory) of 4-(4-aminocyclohexylmethyl) cyclohexanedithiocarbamic acid. This compound is insoluble in water and ethyl and butyl alcohols. Although this compound has been indicated to be the free dithiocarbamic acid, it may exist as the dithiocarbamic acid salt of the unreacted amino group of the dialicyclic diamine and, further, this salt may be polymeric.

EXAMPLE II

*Preparation of disodium 4,4'-methylenebis(cyclohexanedithiocarbamate)*

A solution of 95 parts of bis(4-aminocyclohexyl) methane in 55 parts of 1,4-dioxane was gradually added with stirring to a mixture of 36 parts of sodium hydroxide, 68.75 parts of carbon disulfide, and 250 parts of water in a reactor fitted with a reflux water condenser. A white precipitate appeared at once. The reaction mixture was warmed on a steam bath for 0.5 hour after the addition was completed. The mixture was then cooled to 25° C., diluted with acetone, filtered, and the filter cake washed with acetone and dried in a vacuum oven at 45° C. for 18 hours. There was obtained 105.5 parts (57% of theory) of disodium 4,4'-methylenebis(cyclohexanedithiocarbamate).

EXAMPLE III

*Preparation of zinc 4,4'-methylenebis(cyclohexanedithiocarbamate)*

Fifteen and two-tenths (15.2) parts of disodium 4,4' - methylenebis(cyclohexanedithiocarbamate) was dissolved in a mixture of 300 parts of water and 270 parts of acetone and the resulting solution filtered. To this solution in an open vessel there was added a solution of 5.5 parts of anhydrous zinc chloride dissolved in 50 parts of water. The finely divided white precipitate which formed immediately was digested on a steam bath for 30 minutes and then separated from the solution by filtration. There was obtained, after drying to constant weight in a vacuum desiccator at 25° C., 11.5 parts (60.5% of theory) of zinc 4,4'-methylenebis(cyclohexanedithiocarbamate).

EXAMPLE IV

*Preparation of copper 4,4'-methylenebis-(cyclohexanedithiocarbamate)*

A filtered solution of 10 parts of disodium 4,4'-methylenebis(cyclohexanedithiocarbamate) in 200 parts of methanol and 150 parts of water was added with stirring to a solution of 12 parts of anhydrous copper sulfate and 100 parts of water in an open glass vessel. A flocculant precipitate formed at once which, after standing overnight in the reaction mixture, was removed by filtration, slurried with water three times, and finally refiltered. There was obtained, after drying in a vacuum oven at 60° C. for 18 hours, 7.95 parts (64% of theory) of copper 4,4'-methylenebis-(cyclohexanedithiocarbamate).

EXAMPLE V

*Preparation of nickel 4,4'-methylenebis-(cyclohexanedithiocarbamate)*

A filtered solution of 10 parts of disodium 4,4'-methylenebis(cyclohexanedithiocarbamate) in 80 parts of methanol was diluted with 100 parts of water and the resulting solution added with stirring to a solution of 21.5 parts of nickel nitrate hexahydrate and 200 parts of water in an open vessel. A thick precipitate separated at once. The reaction mixture was diluted with 200 parts of water, filtered, and the filter cake washed well with water. There was obtained, after drying at 60° C. in a vacuum oven for 18 hours, 8.3 parts (67.5% of theory) of nickel 4,4'-methylenebis-(cyclohexanedithiocarbamate).

*Analysis.*—Calculated for $C_{15}H_{24}N_2S_4Ni$: C, 43.0%; H, 5.7%. Found: C, 44.1%; H, 6.3%.

The examples above illustrate the invention utilizing one diamine, namely bis(4-aminocyclohexyl)methane as the source of the dithiocarbamic acid However, the invention is generic to the mono- and bis-dithiocarbamic acids, their salts, esters, and sulfides, of alicyclic diamines having two amino cyclohexyl,

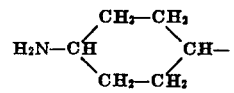

radicals joined, at the 4 positions, through a chain of 0 to 4, i. e., not more than 4, methylene groups, i. e., through —$(CH_2)_m$— where $m$ is a cardinal number not greater than 4, including the mono- and bis-dithiocarbamic acids of bis(4-aminocyclohexyl) [Balas and Sevcenko, Collection Czechoslov. Chem. Communications 3, 171–176 (1931)]; 1,4 - bis(4-aminocyclohexyl)butane, [Ferber, Ber. 62B, 192 (1929)] and bis(4-aminocyclohexyl)methane, 1,2 - bis(4-aminocyclohexyl)ethane and 1,3-bis(4-aminocyclohexyl) propane as disclosed and claimed in the copending application of Kirk, Schreiber and Whitman, Serial No. 615,912, filed September 12, 1945.

A representative group of salts is listed above. Numerous other salts of the dithiocarbamic acids of this invention from dialicyclic diamines can be prepared in a similar manner. For example, the 4,4'-methylenebis(cyclohexanedithiocarbamate) salts of any metallic element may be prepared. Such salts may be prepared by the direct metathesis between a solution of a salt of the metallic element whose dithiocarbamic acid salt is desired with a solution of the readily prepared and more soluble alkali metal salts of the dialicyclic dithiocarbamic acids of this invention. Such metathetical reactions are represented by the following equation, utilizing as examples disodium 4,4'-methylenebis(cyclohexanedithiocarbamate) and cadmium chloride:

ylethylenediamine, p-phenylenediamine; cyclic amines, e. g., piperidine, piperazine, 2,5-dimethylpiperazine, morpholine; heterocyclic amines, e. g.,

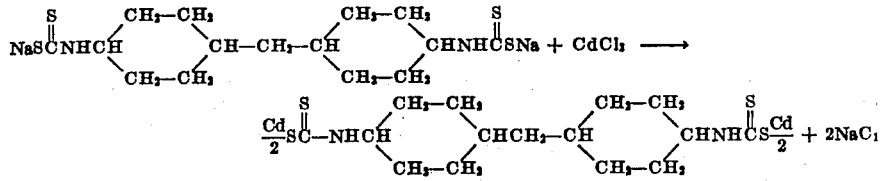

Among such salts, the more important are the salts of univalent and bivalent elements, such as, for example, potassium, lithium, chromium, barium, iron, calcium, copper, lead, mercury, manganese, magnesium, and tin. Other salts may be prepared, such as the salts of ammonia and substituted ammonias, for example, primary aliphatic amines, e. g., methylamine, ethylamine, amylamine, dodecylamine; secondary aliphatic amines, e. g., dimethylamine, diamylamine, ethyl propylamine; primary aromatic amines, e. g., beta-naphthylamine and p-methylaniline; secondary aromatic amines, e. g., diphenylamine, N-ethylaniline, N-butylaniline; primary aromatic-aliphatic amines, e. g., 2-phenylethylamine, 3-phenylpropylamine; secondary aromatic-aliphatic amines, e. g., di-2-phenylethylamine and ethyl-2-phenylethylamine; substituted primary aliphatic amines, e. g., 2-chloroethylamine, 3-nitropropylamine, 4-ethoxybutylamine, 1-phenoxy-6-aminohexane; substituted secondary aliphatic amines, e. g., N-(2-chloroethyl)ethylamine, N-methyl-3-nitropropylamine, N-methyl-2-phenoxyethylamine; substituted primary aromatic amines, e. g., 4-nitroaniline, 3-chloroaniline, 2-ethylaniline, 4-ethoxy-2-chloroaniline, 4-aminodiphenyl ether; substituted secondary aromatic amines, e. g., N-methyl-p-chloroaniline, N-phenyl-p-nitroaniline; substituted primary aliphatic-aromatic amines, e. g., 2-(4-chlorophenyl)ethylamine, 3-(3-nitrophenyl)propylamine; substituted secondary aliphatic-aromatic amines, e. g., N-methyl-2-(4-chlorophenyl)ethylamine, N-ethyl-3-(4-ethoxyphenyl)propylamine; primary cycloaliphatic amines, e. g., cyclohexylamine and 2-aminodecahydronaphthalene; secondary cycloaliphatic amines, e. g., dicyclohexylamine and N-methylcyclohexylamine; substituted primary cycloaliphatic amines, e. g., 4-nitrocyclohexylamine, 3-chlorocyclohexylamine;

alpha-aminothiophene, 2-aminopyridine, 2-amino-4-methylthiazole; tertiary aliphatic amines, e. g., trimethylamine, triethylamine; tertiary aromatic amines, e. g., quinoline and pyridine.

Other derivatives such as the organic esters of these new mono- or bis-dithiocarbamic acids of this invention, may be readily prepared, for example, by treating a salt of the mono- or bis-dithiocarbamic acid with an organic halide in an inert organic solvent, separating by filtration the halide salt which precipitates and isolating the organic ester of the mono- or bis-dithiocarbamic acid from the reaction solvent. Among the organic halides that can be used in making these derivatives, there may be mentioned: alkenyl halides, such as alkyl bromide; alkenyl polyhalides such as 1,4-dichloro-2-butene; alkyl halides such as ethyl iodide; alkyl polyhalides such as methylene chloride; aromatic halides such as 1,3-dinitro-5-chlorobenzene; aralkyl halides such as 2-phenylethylchloride. The preparation of such organic ester derivatives may be described by the following equation utilizing disodium 4,4'-methylenebis(cyclohexanedithiocarbamate) and benzyl chloride for purposes of illustration:

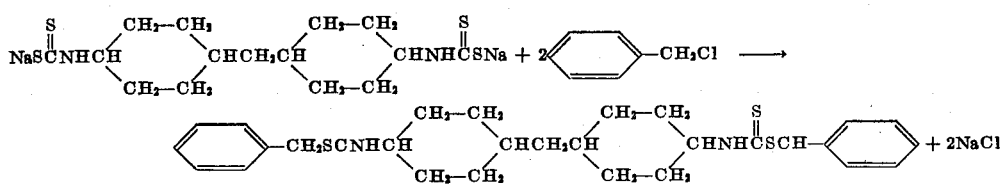

Many other salts or esters will be readily apparent to those skilled in the art.

The dialicyclic thiuram disulfides of this invention are readily prepared by oxidizing the dialicyclic dithiocarbamic acids or salts of this invention with oxidizing agents such as iodine, bromine, chlorine, sodium nitrite, peroxides or any other oxidizing agent disclosed in the literature as effective in such capacity. Such oxidizing agents may be added directly to the reaction mixture used for the preparation of the dithiocarbamic acids in which case, of course, the thiuram disulfide is obtained directly.

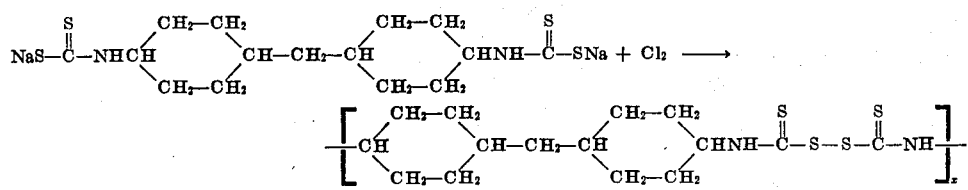

substituted secondary cycloaliphatic amines, e. g., N-methyl-4-chlorocyclohexylamine, N-ethyl-4-ethoxycyclohexylamine; polyamines, e. g., ethylenediamine, hexamethylenediamine, N,N'-dieth- These dialicyclic thiuram disulfides may be converted to the corresponding thiuram monosulfides by reaction with potassium cyanide, e. g. according to the following equation

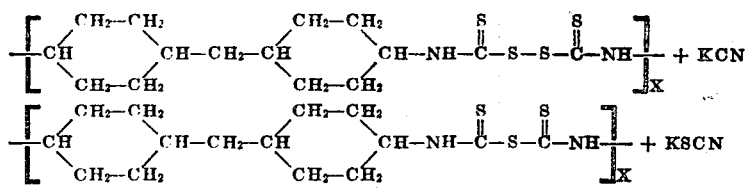

The dialicyclic thiuram monosulfides may also be prepared by treating a salt of the dialicyclic mono- or bis-dithiocarbamic acid with phosgene and subsequently pyrolyzing the resulting product at relatively low temperatures thus splitting out carbon oxysulfide and forming the desired product.

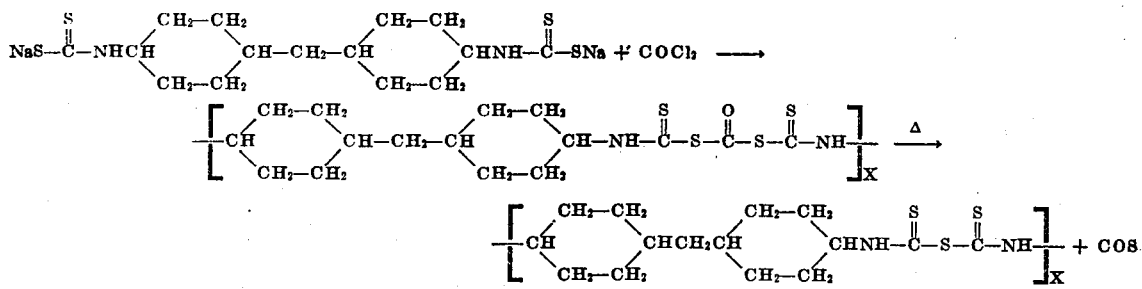

The thiuram mono- and di-sulfides prepared as described above from the dialicyclic bis-dithiocarbamates of this invention may be polymeric.

These various salts, esters and sulfides of the mono- or bis-dithiocarbamic acids of dialicyclic diamines are useful as accelerators for the vulcanization of rubber. Preferred are the salts due to their superior accelerator action and also their stability in aqueous solution or suspension. The salts of divalent metallic elements can be used as bactericides and fungicides.

Other derivatives such as, for example, isothiocyanates may be readily prepared from the dithiocarbamic acids and their salts of this invention. For instance, methylenedi-1,4-cyclohexylene diisothiocyanate may be prepared as described in the following paragraphs:

A suspension of disodium 4,4'-methylenebis-(cyclohexanedithiocarbamate) was prepared in the following manner in which the parts given are by weight:

A solution of 284 parts of bis(4-aminocyclohexyl)methane in 110 parts of 1,4-dioxane was added dropwise with stirring to a cooled (15 to 20° C.) mixture of 108 parts of sodium hydroxide, 208 parts of carbon disulfide and 800 parts of water in a reactor fitted with a reflux water condenser. The reaction mixture was allowed to warm to 45° C. during the addition and when the reaction was completed was heated on the steam bath for 30 minutes in such a fashion as to avoid foaming. This suspension of disodium 4,4'-methylenebis(cyclohexanedithiocarbamate) was then cooled to 40° C. and 320 parts of ethyl chlorocarbonate added dropwise with stirring. After the addition was complete, the mixture was heated for 30 minutes on the steam bath with stirring. After cooling to room temperature, the separated oily solid was extracted from the reaction mixture with diethyl ether. The ether extract was washed with dilute sodium hydroxide, dilute hydrochloric acid and finally with water; dried over calcium chloride and the ether removed by distillation leaving 374 parts of yellow oil. This was made to crystallize by stirring in 200 parts of methanol at room temperature. The solid was separated by filtration and subsequently recrystallized from a mixture of 240 parts of n-butanol and 200 parts of methanol. There was obtained after filtration and drying in a vacuum desiccator for 18 hours at 25° C. 184 parts (46.7% theory) of crystalline methylenedi-1,4-cyclohexylene diisothiocyanate melting at 98 to 112° C.

*Analysis.*—Calculated for $C_{15}H_{22}N_2S_2$: C, 61.2%; H, 7.5%; N, 9.5%; S, 21.8%. Found: C, 61.0%; H, 7.7%; N, 9.3%; S, 21.7%.

These alicyclic mono- and diisothiocyanates, respectively, may be reacted with primary or secondary monoalcohols to give dialicyclic mono- and diurethanes and with primary or secondary glycols to give di- and polyurethanes.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A member of the class consisting of dithiocarbamic acids, their salts, and their esters, said acid having the formula

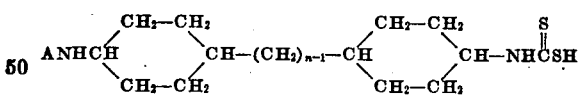

wherein A is a radical of the class consisting of hydrogen and

and $n$ is an integer from 1 to 5.

2. A dithiocarbamic acid of the formula

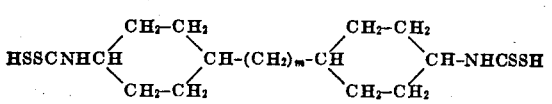

where $m$ is a cardinal number not greater than 4.

3. A salt of a dithiocarbamic acid of the formula

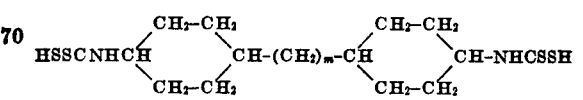

wherein $m$ is a cardinal number not greater than 4.

4. A salt of a metal, of valence not greater than 2, of a dithiocarbamic acid of the formula

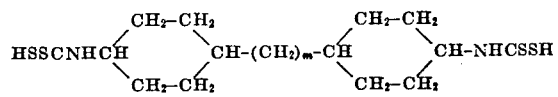

wherein $m$ is a cardinal number not greater than 4.

5. 4,4'-methylenebis(cyclohexanedithiobamic acid).

6. A salt of 4,4'-methylenebis(cyclohexanedithiocarbamic acid).

7. A salt of a metal, of valence not greater than 2, of 4,4'-methylenebis(cyclohexanedithiocarbamic acid).

WILLIAM KIRK, Jr.

REFERENCES CITED

The following references are of record in the file of this patent:

UNITED STATES PATENTS

| Number | Name | Date |
| --- | --- | --- |
| 2,060,733 | Hunt et al. | Nov. 10, 1936 |
| 2,265,851 | Matheson | Dec. 9, 1941 |
| 2,340,650 | Dean | Feb. 1, 1944 |

FOREIGN PATENTS

| Number | Country | Date |
| --- | --- | --- |
| 387,924 | Great Britain | of 1933 |